(12) United States Patent
Schubbach et al.

(10) Patent No.: US 7,897,223 B2
(45) Date of Patent: Mar. 1, 2011

(54) PALLET CONTAINER, AND METHOD FOR PRODUCING AN ELECTROSTATICALLY NON-CHARGEABLE AND/OR ELECTRIC CHARGE-DRAINING PALLET CONTAINER

(75) Inventors: Reinhard Schubbach, Bergen (DE); Klaus Peter Schmidt, Bonn (DE)

(73) Assignee: Mauser-Werke GmbH, Brühl (DE)

( * ) Notice: Subject to any disclaimer, the term of this patent is extended or adjusted under 35 U.S.C. 154(b) by 0 days.

(21) Appl. No.: 12/389,425

(22) Filed: Feb. 20, 2009

(65) Prior Publication Data

US 2009/0152151 A1 Jun. 18, 2009

Related U.S. Application Data

(63) Continuation of application No. 10/595,481, filed as application No. PCT/EP2004/011914 on Oct. 21, 2004, now abandoned.

(30) Foreign Application Priority Data

Oct. 23, 2003 (DE) .............................. 203 16 382 U

(51) Int. Cl.
*B32B 27/08* (2006.01)
*B32B 27/32* (2006.01)
*B65D 19/00* (2006.01)

(52) U.S. Cl. .................... 428/35.7; 428/34.1; 428/36.4; 206/386

(58) Field of Classification Search ................ 428/34.1, 428/35.7, 35.8, 35.9, 36.4, 36.6, 36.7; 206/386
See application file for complete search history.

(56) References Cited

U.S. PATENT DOCUMENTS 5,744,504 A * 4/1998 Oishi et al. .................... 521/50
6,344,508 B1 * 2/2002 Endo et al. ................. 524/313
6,398,059 B1 * 6/2002 Hayashi et al. ............. 220/562

FOREIGN PATENT DOCUMENTS

DE 38 44 605 A1 2/1990

(Continued)

OTHER PUBLICATIONS

Database WPI, Section Ch, Week 200257, Derwent Publications Ltd., London, GB; AN 2002-532595 XP002318753 & JP 2002 146212 A (Sanyo Chem Ind Ltd), May 22, 2002.

*Primary Examiner*—Walter B Aughenbaugh
(74) *Attorney, Agent, or Firm*—Henry M. Feiereisen; Ursula B. Day

(57) ABSTRACT

A pallet container includes a bottom pallet, a lattice frame, and a multilayer inner container made of thermoplastic material by a blow-molding technique and received in the lattice frame, for storing and transporting liquid fill material. The inner container has an exterior layer which is configured to be incapable of permanently retaining an electrostatic charge by allowing electric charges to be drained. The exterior layer contains an antistatic compound and has a layer thickness which does not or only insubstantially change a transparency or translucency of the exterior layer, allowing easy optical detection of a fill level of the liquid fill material in the container. The exterior layer includes a fusible, easily stretchable thermoplastic material (polymer). At least one of a center layer and an interior layer of the multilayer container includes a cold-impact-resistant HDPE material (High Density Polyethylene) with a high molecular weight.

10 Claims, 2 Drawing Sheets

FOREIGN PATENT DOCUMENTS

| | | |
|---|---|---|
| DE | 41 36 766 A1 | 5/1993 |
| DE | 196 05 890 A1 | 8/1997 |
| DE | 202 06 436 U | 8/2002 |
| EP | 0 111 602 A | 6/1984 |
| EP | 0 219 315 A | 4/1987 |
| JP | 2002 146212 | 5/2002 |
| WO | WO 03/029000 A | 4/2003 |

\* cited by examiner

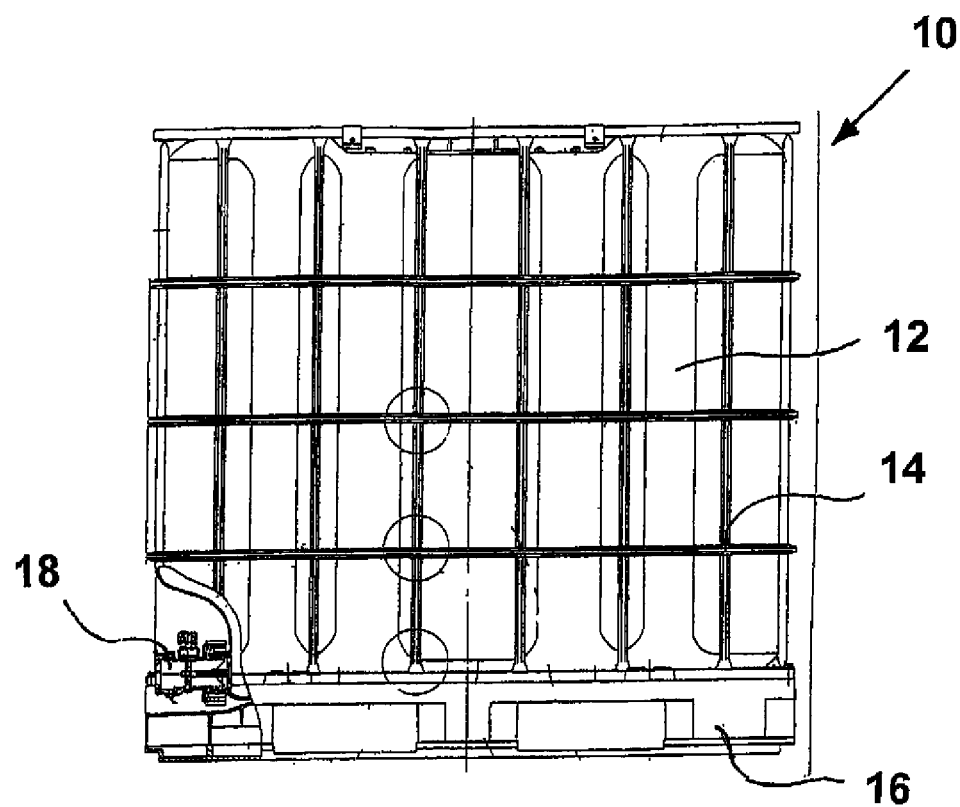
Fig. 1
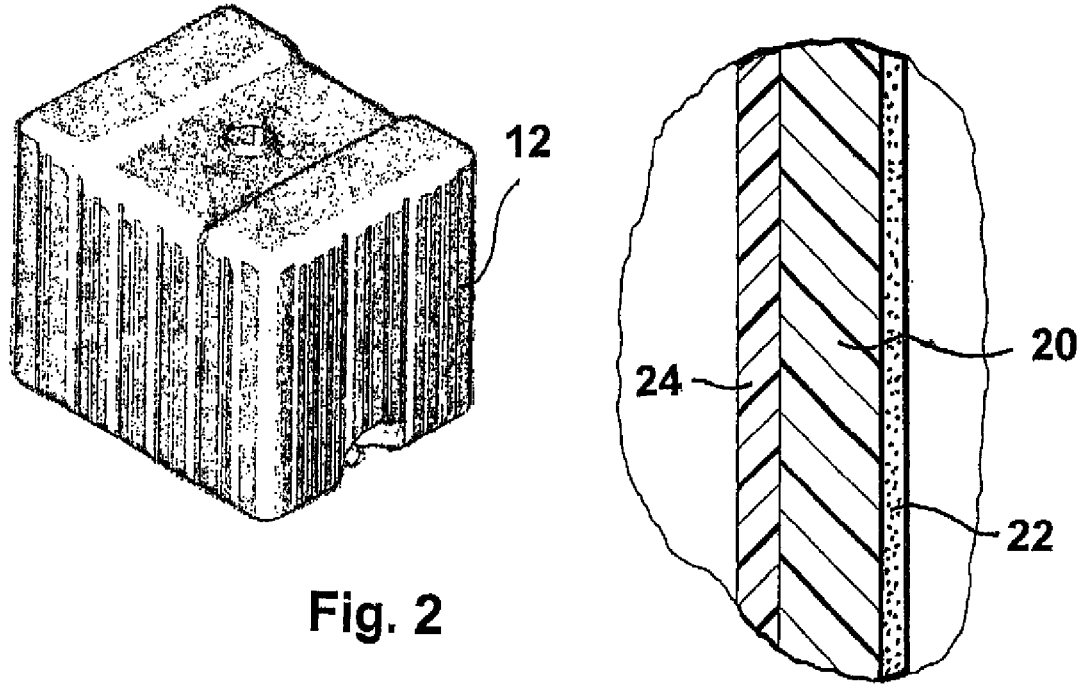
Fig. 2
Fig. 3

PALLET CONTAINER, AND METHOD FOR PRODUCING AN ELECTROSTATICALLY NON-CHARGEABLE AND/OR ELECTRIC CHARGE-DRAINING PALLET CONTAINER

CROSS-REFERENCES TO RELATED APPLICATIONS

This application is a continuation of prior filed U.S. application Ser. No. 10/595,481, filed Apr. 21, 2006, now abandoned, the priority of which is hereby claimed under 35 U.S.C. §120, and which in turn is the U.S. national stage of PCT International application no. PCT/EP2004/011914, filed Oct. 21, 2004, which designated the United States and has been published but not in English as International Publication No. WO 2005/040269 and which claims the priority of German Patent Application, Serial No. 203 16 382.6, filed Oct. 23, 2003, pursuant to 35 U.S.C. 119(a)-(d).

The contents of U.S. application Ser. No. 10/595,481, PCT/EP2004/011914, and German Patent Application, Serial No. 203 16 382.6 are incorporated herein by reference in its entirety as if fully set forth herein.

BACKGROUND OF THE INVENTION

The invention is directed to a method for producing containers made of a thermoplastic material that cannot be permanently electrostatically charged and from which electric charges can be drained, and to a plastic container produced according to the method with a permanently electrostatically non-chargeable and/or electric charge-draining coating, for storing and transporting liquid fill material, in particular for flammable or potentially explosive fill materials.

A plastic container of this type typically has vertically oriented container walls with a horizontal container top wall and container bottom wall, wherein a closable fill and/or drain port that is a gas-tight and liquid-tight is arranged at least on the container top wall or on the container cover. The plastic container can be configured, for example, as a canister, barrel, a tight-head drum, a drum with removable cover and clamping ring, or as an inner container of a pallet container.

For use or application with flammable or potentially explosive fill materials, plastic containers are frequently—at least in the exterior layer—colored black with electrically conducting carbon black for obtaining a surface that cannot be permanently electrostatically charged and from which electrostatic charges can be drained.

In general, it is desirable that plastic containers with a colored exterior layer be able to indicate the respective fill or drain state of the container. Such plastic containers typically have a narrow vertical strip for visual inspection, indicating the respective fill level of the fill material in the container. Manufacture of plastic containers with a visual inspection strip by a blow molding process is fairly complex and requires an extrusion head equipped with an additional extruder for the material of the visual inspection strip.

A conventional pallet container (=fluid container of this type) is disclosed, for example, in DE 196 05 890 A1 (Pro. Feb. 19, 1996). When a fluid container of this type is filled or drained, or when the liquid fill material sloshes back and force due to movement in transit, or when fluids in these plastic containers are stirred, for example, for the purpose of mixing, electric charges generated by friction between the fluid and the container surface are discharged to ground by—as referred to in this publication—a permanent antistatic or an electric charge-draining exterior layer of the inner container and the metallic support frame (steel pallet).

The permanent antistatic coating is here made of a plastic having an additive of conductive carbon black (this is generally known as an electric charge-draining, but not as an antistatic coating!). This prevents an electric discharge, possibly accompanied by spark generation, between the plastic inner container and the metallic lattice cage, which can cause ignition of potentially flammable fill materials of the pallet container or of potentially explosive mixtures of gases and vapors.

The known pallet container with a colored or blackened exterior layer (conductive carbon black) disadvantageously precludes a visual inspection of the fill level without an inspection strip due to the outer coloration of the plastic inner container. The addition of carbon black also significantly reduces the mechanical strength of the plastic material, in particular by reducing the resistance to fracture and its weldability.

Another pallet container disclosed in DE 38 44 605 (Sch. Jun. 11, 1988) has at least one inspection strip made of a translucent or transparent plastic material which forms a unit with the black colored plastic material (single layer material continuously colored).

Moreover, DE 41 36 766 (Ro. Nov. 8, 1991) discloses a multi-layer container wall with a colored exterior container layer having a discontinuous region in the layer in the form of a strip. The strip-shaped discontinuous region of the layer is materially connected with the colored plastic material of the outer container layer.

Another pallet container with a multi-layer inner container, with a permanent antistatic exterior layer colored with carbon black and with at least one integrated visual inspection strip made of a transparent plastic material is known from DE 202 06 436 (Pro. Apr. 23, 2002).

All of the aforedescribed colored plastic containers have a continuous visual inspection strip which is arranged in the container wall and made of the colorless plastic material of the interior layer. The manufacture of these plastic containers involves a complex process and typically requires an additional extruder. If the inspection strip is combined with an adjoining volume scale, the circumferential location of the inspection strip on the inner container must exactly match the circumferential location of the volume scale. In addition, exact vertical alignment of the inspection strip on the inner container is difficult to maintain during the manufacture of the inner container, i.e., during blowing and stretching of the tubular preform in a cuboid blow mold.

SUMMARY OF THE INVENTION

It is therefore an object of the present invention to provide a corresponding method and a plastic container produced with the method, which has the advantageous properties of a surface that cannot be permanently electrostatically charged and from which electric charges can be drained, without suffering from the previous mentioned disadvantages (black coloration) of conventional plastic containers.

This object is solved in accordance with the invention by a method in which the permanently electrostatically non-chargeable or electric charge-draining properties of the exterior layer are adjusted by adding and admixing to the colorless plastic material of the exterior layer a limited quantity of a specific polymer-based compound, and the layer thickness of the exterior layer is made so thin, that the transparency or translucency of the compounded exterior layer is diminished not at all or only insignificantly, so that the fill level of a fluid filled in the container can be easily optically detected. The particular compound material is almost colorless or has only a very slight colorizing property. It is therefore a very significant advantage that the electric charge-draining or permanent antistatic exterior layer of the plastic container with a compounded antistatic master batch (Permastat material) can remain transparent or translucent, thereby obviating the need for incorporating an inspection strip.

The "non-chargeable" or "charge-draining" effect of the thin exterior layer is herein achieved by a conductive transparent co-polymeric thermoplastic material. This is a polyamide-polyamide ether-group amide plastic material which achieves its conductivity through a so-called "functional group", namely the polyether-group amide. The quantity of these co-polymers added to the plastic base material of the exterior layer is approximately 10% to 20%. A surface resistance of between $10^{12}$ and $10^8 \Omega/\square$ is achieved, so that the containers are no longer chargeable and are at the limit of their ability to drain charges. The non-chargeable effect is not even reduced at a very low relative humidity of the ambient air (for example, approximately 10% relative humidity). The attained antistatic property represents the ability of the employed material to prevent tribo-electric charge buildup, wherein the conductive thermoplastic compound is a mixture of plastic base materials and conductive additives, which overcome the natural insulating properties of the base material.

Because the blow molding process causes significant stretching in the corner regions, in particular of large-capacity plastic containers with corners, such as the inner containers of pallet containers, the layer thickness of the exterior electrostatically non-chargeable or electrostatically charge-draining plastic layer may become too thin or the layers may even fracture. This negatively impacts the functionality of the container. Conventional measurement methods, such as rod or ring electrodes, are barely or not at all able to determine the effectiveness of the exterior layer (electric surface resistance, electric charge-draining capability) on the component itself, because the free-form surfaces produced in the blow molding process are frequently curved.

According to an embodiment of the invention, a limited quantity of color pigments is added and admixed to the plastic material of the exterior layer, thereby slightly coloring the plastic material of the exterior layer, so that the two-dimensional distribution of the thin exterior layer and its layer thickness distribution can be visualized and evaluated by a simple optical inspection. The transparency or translucency of the compounded exterior layer is hereby reduced only slightly or not at all, so that the fill level of a fluid filled in the container can still be easily optically detected.

Alternatively, in another embodiment of the invention, a limited quantity of optical brightening agents (chemical additive) is added and admixed to the plastic material of the exterior layer, which under normal conditions produces almost no coloration, by instead only a slight blue tint of the plastic material of the exterior layer. However, under special illumination, for example under illumination with black light, the two-dimensional distribution of the thin exterior layer and its layer thickness distribution can be visualized and optically precisely evaluated.

In a preferred embodiment of the present invention, a fusible, easily stretchable polymer, such as LLDPE (Linear Low Density PolyEthylene) or LDPE (Low Density PolyEthylene) is employed as a plastic material for the thin exterior layer, whereas a cold-impact-resistant, highly viscous, and stretch-resistant HDPE material (High Density PolyEthylene) with a high molecular weight is employed for the center layer(s) and/or for the interior layer(s) of the multi-layer container), to which the antistatic master batch (Permastat material) is admixed. When the LLDPE or LDPE material is used in blow forming, this material can at the same temperature more easily stretch and attain a better surface distribution and a more uniform layer thickness in the highly stretched regions, for example in the corner regions of a plastic inner container of a pallet container, than the HDPE material.

Advantageous modifications of the invention are recited in the depended claims.

The plastic container according to the invention has the following advantages:

the exterior layer of the container cannot be permanently charged electrostatically and drains electrostatic charges, the uniformity of the distribution of the exterior layer and its layer thickness can be optically visualized and evaluated, the fill level of the liquid fill material in the plastic container can be easily determined optically, at any time and from any observation angle, a volume scale for indicating the fill level can be applied at any suitable location.

The plastic container according to the invention will now be explained and described in more detail with reference to an exemplary pallet container. The pallet container which can be used as a returnable container has an interchangeable, cuboid inner container made essentially of High Density Polyethylene (HDPE) with a front wall, a rear wall and two side walls, a bottom formed as a drain bottom, a top wall with a fill opening that can be closed by a screw cap, and a drain port disposed in the lower section of the front sidewall and having a drain fitting.

The plastic inner container is supported on a support pallet, which can be received from all four sides by a forklift. The thin-walled plastic inner container is enclosed on the outside by a lattice frame (support cage) made of intersecting vertical and horizontal metal rods connected with the support pallet.

The plastic inner container which is produced by blow extrusion from essentially high-density polyethylene (HDPE) is constructed of a relatively thick center layer, a preferably thin interior layer, and a very thin, permanently electrostatic non-chargeable or electrical charge-draining exterior layer.

The thickness of the center layer is approximately 1 mm to 2 mm, preferably approximately 1.5 mm, and the thickness of the interior layer is approximately 0.5 mm. The thickness of the exterior layer is between 0.05 mm to 0.5 mm, preferably approximately 0.2 mm. Recycled granulated or ground polyethylene material (recycled HDPE) is used for the center layer, whereas new high-density polyethylene granular material (colorless or natural-colored HD-PE) is used for the interior layer. A Linear Low Density Polyethylene (LLDPE) or Low Density Polyethylene (LDPE) with compounded antistatic material (incorporated Permastat master batch which may include, for example, a mixture of synthetic silicic acid and aluminum oxide) may preferably be used for the exterior layer.

With this particular LDPE material, the thin exterior layer can be better adapted to stretch, in particular in the highly stretched corner regions of large-capacity containers, such as the inner containers of pallet containers. Charging of the thin exterior layer can be prevented by incorporating the copolymer into the plastic base material as a "three-dimensional network." The copolymer network is built up or included in the extruder by an intensive shearing action, whereby the original spherical copolymers are stretched into elongated platelets. The greater the stretching, the better is the conductivity of the plastic base material. The processing temperature in the extruder is preferably approximately 200° C.

For producing plastic containers according to the invention with the goal of attaining a light blue tint, but a still transparent container wall, a Permastat compound based on LLDPE (commercial name Clearflex) with a 0.2% UV absorber (commercial name Chimasorb) with a small number of organic blue pigments was used, which was introduced into the extruder for the cover layer as a ready-mix compound. In the embodiment with an optical brightening agent for evaluating the cover layer through illumination with black light, a lupolene plastic material with 20% addition of a conductive compound (Irgastat) and the 0.2% optical brightening agent (Uvitex) as a support material were introduced into the cover layer extruder. The layer thickness of the charge-draining exterior layer was adjusted to 0.2 mm in the finish container. This made it possible to easily and reliably verify that the layer is distributed continuously and covers the entire area.

In the present invention, the multilayer plastic container, which preferably consists of three layers, is blown up from a tubular preform to the finished container in a blow mold. The tubular preform is produced in a continuously operating extrusion head or in a discontinuously operating storage head with three connected extruders (one extruder for the high-purity interior layer, one extruder for the center layer made of clean recycled granulate, and another extruder for that the thin antistatic exterior layer). The three layers are homogeneously connected with each other in the extrusion head and are demolded from a corresponding ring nozzle of the extrusion head, for example, for a 1000 liter capacity inner container of a pallet container in form of a tubular intermediate product with a wall thickness of approximately 35 mm and an exterior diameter of approximately 300 mm, and are thereafter blown up by compressed air in the blow mold into the finished plastic container with an average wall thickness of approximately 2.5 mm.

Unlike with conventional methods where, for example, heated ionized metal particles are blown onto the surface of the plastic container and are melted into the surface of the plastic material, or where an electrically conducting varnish layer with electrically conducting polymers is preferably applied to the finished plastic container, the process of the invention initially produces in the extrusion head a tubular preform consisting of three polymer layers which are homogeneously joined with one another in a molten state. The exterior layer, through homogeneous admixture of an antistatic compound in the extruder (at approximately 200° C. operating temperature), has continuous antistatic properties, which more particularly are permanent and completely unaffected by abrasion and mechanical stress. In particular, as shown in practical applications, externally applied varnishes can be abraded by transport motion (chafing of the lattice frame on the container surface) and due to their different material properties can detach in response to environmental effects (moisture, frost, UV exposure), and flake or peel off over large areas.

BRIEF DESCRIPTION OF THE DRAWING

The invention will now be explained and described with reference to embodiments schematically depicted in the drawings. It is shown in:

FIG. 1 a pallet container according to the invention,

FIG. 2 an antistatic plastic inner container with a fill level scale,

FIG. 3 a section of a multi-layer container wall,

DETAILED DESCRIPTION OF PREFERRED EMBODIMENTS

Figure 4:
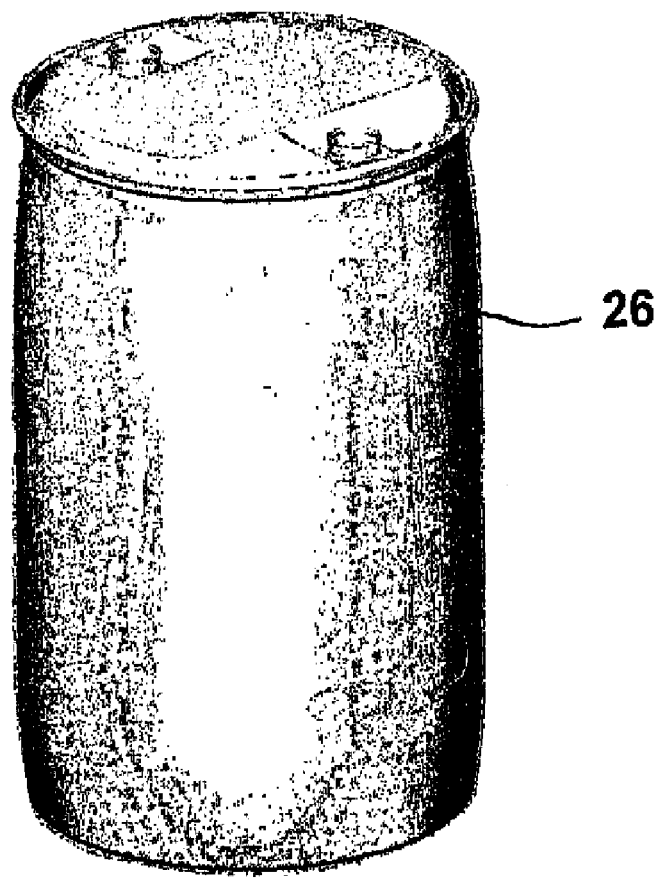
FIG. 4 an antistatic plastic inner container in form of a barrel with a screw cap, and FIG. 5 an antistatic plastic inner container in form of a canister.

FIG. 1 shows a pallet container 10 in particular for flammable or potentially explosive liquids, with a bottom pallet 16, a thin wall cuboid inner container 12 made of plastic with a closable upper fill port and a lower drain port with a drain fitting 18, as well as a lattice frame 14 (support cage) surrounding the inner container 12. The lattice frame 14 consists of vertical and horizontal metal rods, whereby the inner container 12 is provided with a permanent antistatic exterior layer of a transparent or translucent plastic material and includes a fill level scale applied on the outside.

The plastic inner container 12 is formed as a multilayer container and produced by an extrusion blow mold process. The plastic inner container 12 includes, as shown in FIG. 3, a center layer 20, a permanent antistatic exterior layer 22 and an interior layer 24.

In another embodiment, the plastic inner container can be provided with a center layer and a permanent antistatic exterior and interior layer.

Advantageously, the plastic inner container 12 is provided with a drain fitting 18 which can also be an injection molded part made of an antistatic or electric charge-draining plastic.

A pallet container of this construction is suitable for Ex1-areas and satisfies the new transport regulations (2003) for fill materials of Hazard Category 3 with a flashpoint below 61° C.

Figure 5:
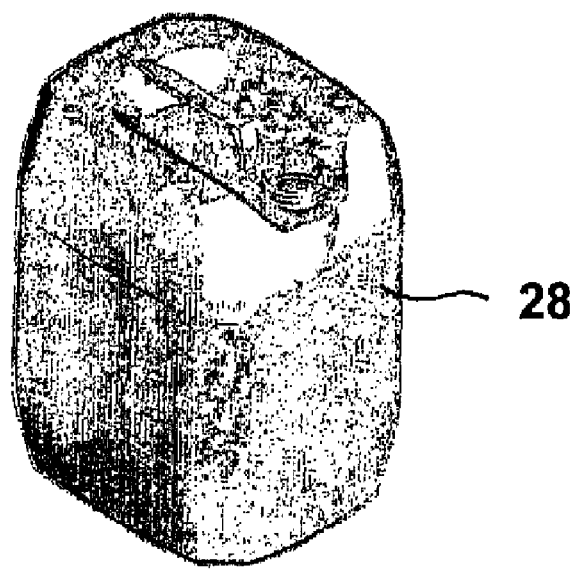

FIGS. 4 and 5 show additional exemplary embodiments of "antistatic" plastic containers according to the present invention in form of a plastic barrel 26 with a screw cap and of a plastic canister 28.

What is claimed is:

1. A pallet container, comprising:
   a bottom pallet;
   a lattice frame; and
   a multilayer inner container received in the lattice frame and having a cuboid configuration for storing and transporting flammable or potentially explosive contents, said inner container including a laterally extending lower drain port for attachment of an extraction fitting, said inner container having a center layer made of HDPE (High Density Polyethylene), an interior layer made of HDPE (High Density Polyethylene), and an exterior layer made of a fusible, stretchable thermoplastic material (polymer) selected from the group consisting of LLDPE (Linear Low Density Polyethylene and LDPE (Low Density Polyethylene), wherein the exterior layer is made of a permanently antistatic or electric charge-draining thermoplastic material by a blow-molding technique and received in the lattice frame, said exterior layer containing a mixed-in antistatic compound to prevent retention of electrostatic charge or allowing electric charges to be drained while allowing visualization of a fill level of the liquid contents in the container, said exterior layer containing color pigments to color the thermoplastic material and thereby render the exterior layer visible for evaluation.

2. The pallet container of claim 1, wherein the layer thickness of the exterior layer is 0.25% to 5% of a wall thickness of the inner container.

3. The pallet container of claim 1, wherein the layer thickness of the exterior layer is about 2% of the wall thickness of the inner container.

4. The pallet container of claim 1, wherein the average wall thickness of the inner container is between 2.0 mm and 2.5 mm, the layer thickness of the exterior layer is between 0.05 mm to 0.2 mm, and the inner container has a capacity of about 1000 liters.

5. The pallet container of claim 4, wherein the layer thickness of the exterior layer is about 0.1 mm.

6. A pallet container, comprising:
a bottom pallet;
a lattice frame; and
a multilayer inner container received in the lattice frame and having a cuboid configuration for storing and transporting flammable or potentially explosive liquid contents, said inner container including a laterally extending lower drain port for attachment of an extraction fitting, said inner container having a center layer made of HDPE (High Density Polyethylene), an interior layer made of HDPE (High Density Polyethylene), and an exterior layer made of a fusible, stretchable thermoplastic material (polymer) selected from the group consisting of LLDPE (Linear Low Density Polyethylene and LDPE (Low Density Polyethylene), wherein the exterior layer is made of a permanently antistatic or electric charge-draining thermoplastic material by a blow-molding technique and received in the lattice frame, said exterior layer containing a mixed-in antistatic compound to prevent retention of electrostatic charge or allowing electric charges to be drained while allowing optical detection of a fill level of the liquid contents in the container, said exterior layer containing a quantity of optical brightening agents which produce no recognizable coloration under ambient light so as to render the exterior layer visible under illumination with black light.

7. The pallet container of claim 6, wherein the layer thickness of the exterior layer is 0.25% to 5% of a wall thickness of the inner container.

8. The pallet container of claim 6, wherein the layer thickness of the exterior layer is about 2% of the wall thickness of the inner container.

9. The pallet container of claim 6, wherein the average wall thickness of the inner container is between 2.0 mm and 2.5 mm, the layer thickness of the exterior layer is between 0.05 mm to 0.2 mm, and the inner container has a capacity of about 1000 liters.

10. The pallet container of claim 9, wherein the layer thickness of the exterior layer is about 0.1 mm.

* * * * *